July 14, 1970   C. L. OKERBLOM   3,520,513
MODULATING BALL VALVE

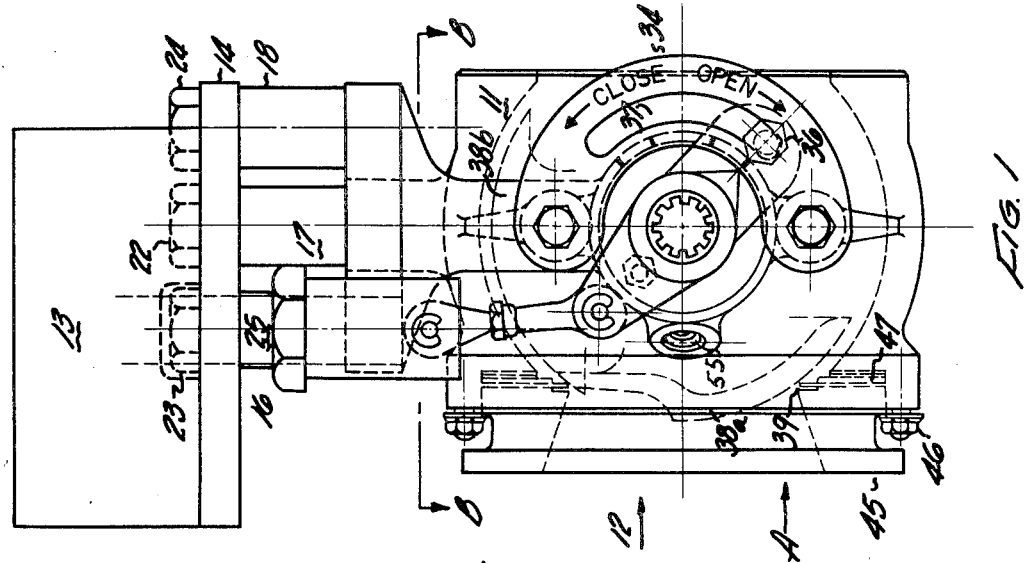
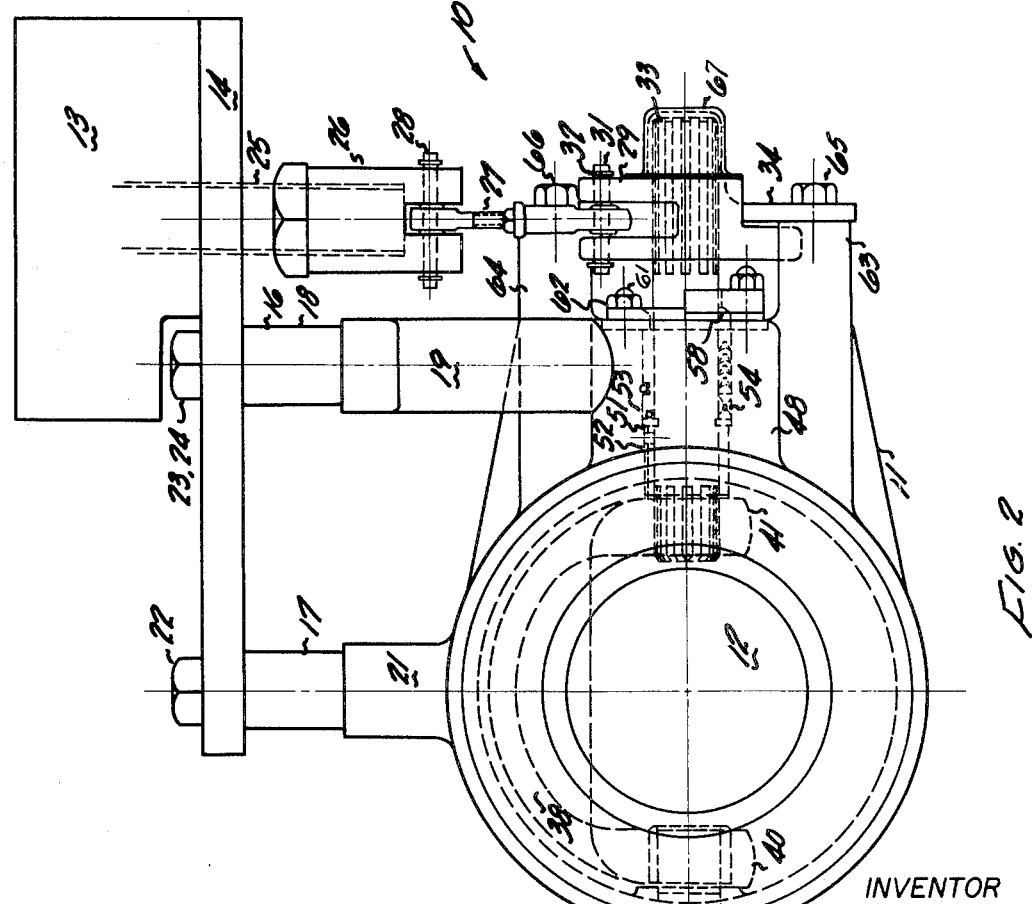

Filed Sept. 29, 1967   3 Sheets-Sheet 3

United States Patent Office 3,520,513
Patented July 14, 1970

3,520,513
MODULATING BALL VALVE
Charles L. Okerblom, Warwick, R.I., assignor to International Telephone and Telegraph Corporation, a corporation of Delaware
Filed Sept. 29, 1967, Ser. No. 671,648
Int. Cl. F16k 5/10, 1/16
U.S. Cl. 251—208                                   7 Claims

ABSTRACT OF THE DISCLOSURE

A modulating ball valve comprising a rotatable plug supported by trunnions journalled along an axis transverse to the line carrying the fluid to be controlled. The surface of the ball plug has a triangular indentation formed therein so that as the plug moves across the face of an orifice plate a pair of apertures are uncovered between the plug and the orifice plate through which the fluid then flows at a controlled rate.

---

This invention relates to flow control valves of the modulating ball type commonly used to control fluid flow and more particularly to valves for controlling variation in the rate of flow of fluids including fluids containing a liberal amount of solid matter or semi-solid matter.

Flow control valves must be capable of controllably varying the rate of flow of fluid in addition to actually stopping and starting the flow. The most usual mode of controlling the rate of flow of fluid is by using a functionally shaped core or plug so that when the core is moved the control aperture changes its shape as well as its size.

Among the problems encountered with valves using functionally shaped cores is the tendency for such cores to be blocked by fluid contaminants, or slurries and slushes. Thus, hydraulic engineers are constantly seeking valves capable of operating efficiently in the environment presented by fluid slurries.

Accordingly, an object of this invention is to provide a new and unique flow control valve which has a plug that is shaped to cooperate with the orifice plate to determine the flow characteristic of the valve while minimizing the adverse effects of solids carried by the controlled fluid.

A more specific object of this invention is to provide a ball valve that controls fluid flow with a flow aperture that is an indentation in the plug, whereby the seal cooperates with the plug to shear solid or semi-solid contaminants due to the movement of the plug against the seal.

A related object of this invention is to provide a flow control valve utilizing a plug having a triangular indentation formed therein which in cooperation with an orifice plate controls the flow and wherein the plug is shaped to provide a plurality of passageways as it is rotated to the open position. In the open position, the effective flow area is maximized and adverse vena effects are minimized.

In accordance with a preferred embodiment of the invention, a flow-control valve is made up of a combination comprising a rotatable plug supported by trunnions journalled along an axis transverse to the line carrying the fluid to be controlled. The plug rotates under the control of any well known sensor actuated operator. As the plug rotates, its surface moves across the face of a seal or orifice plate to enable flow. The plug has a shaped indentation on the surface thereof facing the orifice aperture. In addition, the top of the plug is truncated. As the plug is rotated, the indented portion forms a first port enabling flow through the valve. The truncated portion of the plug forms a second port enabling flow through the valve and minimizing adverse vena effects.

The configuration of the plug resulting in the double ports is especially useful in controlling the flow of slurries, slushes and, in general, highly contaminated fluids having a large amount of suspended solids. The shearing action of the plug against the orifice plate insures positive opening and closing. Particles which may become lodged between the characterized plug and the orifice plate are effectively sheared and the aperture is positively closed. Further, the flow from each of the ports reinforces the flow from the other port and acts to provide a suction or pulling effect on any trapped solids.

In the drawings:

FIG. 1 is a side elevational view of a flow control valve of the present invention;

FIG. 2 is a front view of the valve of FIG. 1;

Figure 4A:
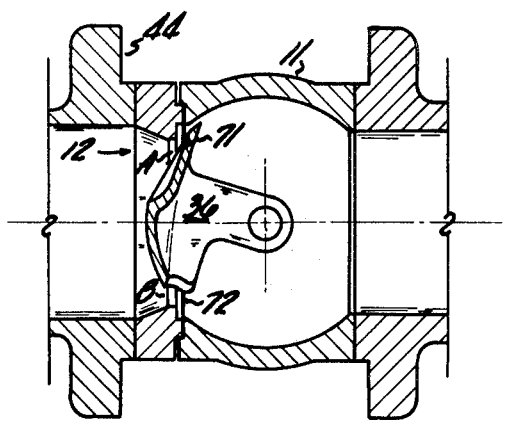
Figure 4B:
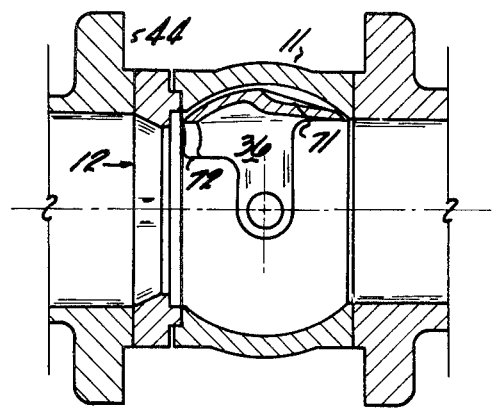
Figure 5:
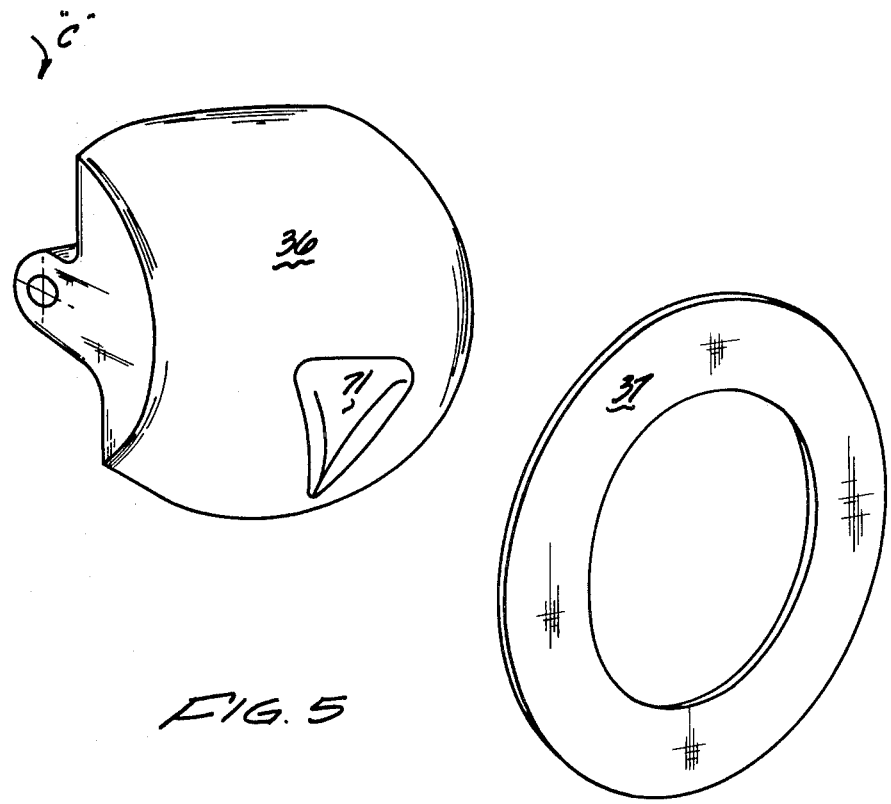

FIGS. 4a and 4b pictorially represent the inventive valve with the ball plug rotated to enable a slight amount of flow, and with the plug rotated to completely open the valve, respectively; and FIG. 5 pictorially represents the indented ball plug of the inventive valve.

The valve arrangement 10 as shown in FIGS. 1 and 2 comprises a casing 11 defining a fluid passageway 12. Means to be described, control flow through the passageway. An operator 13 is shown above the casing in a representative manner. The operator or actuator 13 may be any operator well known to those skilled in the art.

The operator 13 is shown set upon platform 14 which, in turn, is supported on casing 11, and separated therefrom by support means such as the spacers 16, 17 and 18. The spacers 16, 18 rest on tapped pedestal 19 which may, as shown, be an integral part of casing 11. Spacer 17 rests on tapped post 21 also shown as integrally cast onto casing 11. Threaded fasteners, such as screws 22, 23, 24, are inserted through holes in platform 14, the spacers 17 and 16, 18 respectively and threaded into the threaded tapped post 21 and pedestal 19 respectively for securing the platform 14 to the casing 11.

Linkages connect the operator to the means for controlling the flow through passageway 12. More specifically, a threaded operator arm 25 extends from operator 13 below platform 14 toward casing 11. Clevis 26 is used to couple operator arm 25 to actuating arm 27. The threaded operator arm 25 is screwed into the threaded hole in clevis 26, in a well known manner, to adjust the length of the operator arm 25 as required. Clevis 26 is attached to the actuating arm 27 with pin 28 which passes through apertures in the legs of the U-shaped end of clevis 26 and a loop on the open end of rod 27.

The actuating arm 27 is a turnbuckle like arrangement with a loop at either end. The rod is attached to clevis clamp 29, using pin 31 which passes through openings in the legs of the U-shaped portion of the clevis clamp 31 entrapping the bottom loop of rod 27 between the legs. Both pins are shown retained in place with C-washers such as washer 32.

The center of clevis clamp 29 includes a splined hole for receiving splined shaft 33, so that when the operator arm moves, the shaft is forced to rotate. The other end of the clevis clamp is trapped between travel indicator 34 and casing 11. A pointer arrangement, such as nut 36, may be used to more clearly indicate the opened or closed condition of the valve. The travel indicator 34 is arcuately shaped with a similarly shaped arcuate slot 37. The pointer arrangement rides within the slot.

The means that are provided for uniquely controlling the flow of fluid through the passageway 12 are the cooperatively disposed indented ball plug 38 and seal or orifice plate 39 (best seen in FIG. 1).

The plug 38 rotates about trunnions 40, 41 journalled along an axis that is transverse to the flow direction as shown by arrow A in FIG. 1. Trunnion 40 rotates about a pivot pin 42 which is attached to a projection 43 in the casing 11 by any well known means. For example, as shown in FIG. 2, a threaded fastener 41 cooperates with a pivot pin 42 to secure the pin to the projection 43. Gasket, O-ring or packing sealing arrangements may be used at this point.

The casing 11, by way of example, is shown terminated in end flange 45. Fasteners, such as bolt 46, are used to secure the end flange which slip fits into casing 11. The end flange presses the orifice plate 39 against gaskets 47 to sandwich it into place between the end flange 45 and the casing 11.

In FIG. 1 the ball plug 38 is shown in both the closed 38a and opened position 38b. As best seen in FIG. 2, the splined shaft 33 is fitted into the trunnion 41 so that the plug is operated responsive to the rotation of the shaft. Protrusion 48 contains a passageway and sealing arrangement for the shaft. Actually, any well known sealing arrangement can be used. For example, the sealing arrangement may comprise graphite and asbestos packing, which is well known in the art.

More specifically, a bushing 51 is fitted into the bore of projection 48. The bushing is prevented from rotating with the splined shaft by a pin applied in groove 52. The bushing 51 is followed by split ring washer 53. A gland 54 is provided for lubricating the rotating shaft through lubricating passageway 55, (as shown in FIG. 1).

A packing follower 58 assures that the packing retains its proper position and shape. A packing follower flange fastened to projection 48 with stud 61 and nut 62 retains pressure on the follower. A pair of internally threaded posts 63, 64 extend beyond projection 48. These posts are used for attaching the travel indicator 34 using threaded fasteners, such as bolts 65, 66 respectively.

As best seen in FIG. 2 the splined shaft 33 extends beyond clevis clamp 29. A cover 67 is normally provided over the extended shaft for reasons of safety. A feature of this valve arrangement is that the operator linkage can be disconnected and the valve set for manual operation by merely attaching an appropriate crank or wheel to the portion of the splined shaft extending beyond the indicator plate.

Figure 3:
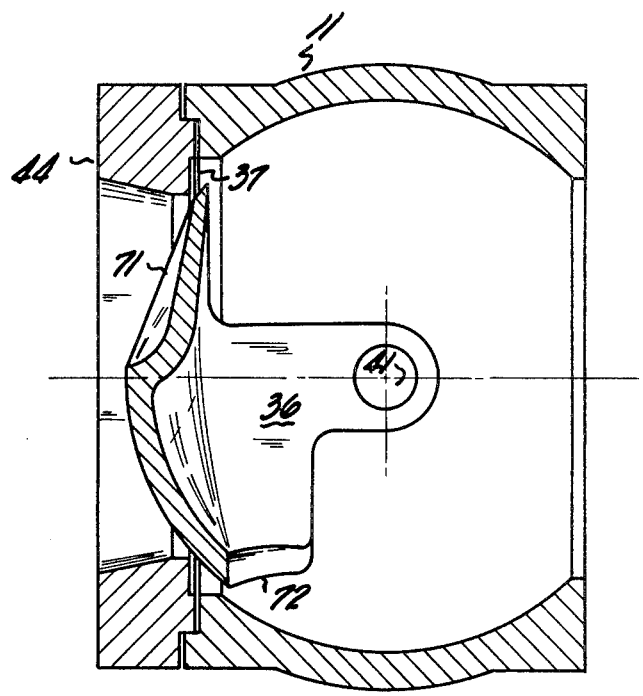
FIG. 3 is a sectional view of pertinent portions of the valve itself taken along line 3—3 of FIG. 1 in the direction of the arrows.

The cross-section view of FIG. 3 shows the operative parts of the inventive valve. The casing 11 defines the passageway 12. The flow through passageway 12 is controlled by the indented ball plug 36. The ball plug rotates about the pivot pin 41 responsive to the rotation of the splined shaft 33. The flange 44 adapts the valve to the associated pipeline and in addition acts to retain and position the orifice plate 37. In the closed position, the plug abuts and fills the opening in the orifice plate to prevent fluid flow.

The plug 36 has on its face a recess or indentation 71 which as shown in FIG. 4a, forms a port A in cooperation with the orifice plate, when the plug is rotated. In addition, the plug is truncated at 72 forming a second port, port B, when the plug is rotated.

The indentation formed in the plug, as shown in FIG. 4b, provides extremely efficient use of the flow area of passage 12 when the valve is in the open position.

FIG. 5 pictorially shows the indentation 71 and the generally truncated form of the spheroidal plug. As shown, the indentation 71 is triangular in shape. The apex of the triangle is closer to the seal than is the base of the triangle in the direction of rotation as indicated by arrow C. This shape and position of the indentation, of course, determines the flow characteristics of the valve. If the base of the triangle were closer to the seal then the initial flow volume would be much greater than on the arrangement illustrated.

The truncated spheroidal plug provides two ports during the opening process. Thus, when the valve is partially opened, for example, approximately 17 degrees of rotation as shown in FIG. 4a, a fluid flows through the identation 71 past the seal and also over the top truncated portion of the plug 72. An advantage of the truncated plug is that when the valve is fully open, plug interference with flow is minimized.

The use of the indentation to form a port in a modulated ball valve assures that solid and semi-solid contaminants are sheared between the plug and the periphery of the recess or indentation when the plug is actuated to move between the open and closed positions.

I claim:

1. A modulating ball valve comprising a valve casing having an inlet passage and an outlet passage, means coupled to said casing for coupling said valve to a line, orifice plate means within said casing, plug means located within said casing, means coupled to said plug means for rotatably supporting said plug means to selectively block said orifice plate means for controlling flow through said line and said plug means comprising a triangular indentation formed on the face thereof, said indentation forming a first aperture when said plug means rotates so that said indentation is contiguous to said orifice plate means.

2. The modulating ball valve of claim 1 wherein the triangular indentation is so oriented with respect to the direction of rotation that the apex of said triangularly shaped indentation reaches the orifice plate before the base of the indentation as said plug means rotates to open said aperture.

3. The modulating ball valve of claim 2 wherein said identation is centrally located on said plug means.

4. The modulating ball valve of claim 1 wherein said plug means has a truncated spheroidal shape.

5. The modulating ball valve of claim 5 wherein the truncated end of said plug means is located adjacent the base of said triangular indentation and moves toward the orifice plate to form a second aperture when said plug means rotates to open the first aperture of said indentation.

6. The modulating ball valve of claim 5 wherein the triangularly shaped indentation is so oriented with respect to the direction of rotation that the apex of said triangularly shaped indentation reaches the orifice plate means before the base of the indentation as said plug means rotates to open said first and second apertures.

7. The modulating ball valve of claim 5 wherein the height of the indentation is of such magnitude relative to the height of the orifice plate that said first aperture commences closing and is fully closed before said second aperture is fully opened.

References Cited

UNITED STATES PATENTS

| | | | |
|---|---|---|---|
| 1,113,976 | 10/1914 | Fisher | 251—301 |
| 2,302,695 | 11/1942 | Kalix | 251—301 |
| 3,191,906 | 6/1965 | Zeigler et al. | 251—208 |
| 3,379,408 | 4/1968 | Lowrey | 251—298 |

HENRY T. KLINKSIEK, Primary Examiner

U.S. Cl. X.R.

251—298